(12) United States Patent
Hao et al.

(10) Patent No.: US 9,749,197 B2
(45) Date of Patent: Aug. 29, 2017

(54) MOBILE USER DATA COLLECTION

(75) Inventors: Jack Jianxiu Hao, Lexington, MA (US); Martin Busse, Woburn, MA (US); John F. Gallagher, Hopewell, NJ (US); Shadman Zafar, Coppell, TX (US); Dahai Ren, Waltham, MA (US); Andrien John Wang, Keller, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 964 days.

(21) Appl. No.: 12/958,786

(22) Filed: Dec. 2, 2010

(65) Prior Publication Data

US 2012/0143918 A1    Jun. 7, 2012

(51) Int. Cl.
| | |
|---|---|
| *G06F 7/00* | (2006.01) |
| *H04L 12/24* | (2006.01) |
| *H04W 4/00* | (2009.01) |
| *H04L 29/08* | (2006.01) |
| *G06F 17/30* | (2006.01) |

(52) U.S. Cl.
CPC .......... *H04L 41/5064* (2013.01); *H04L 67/20* (2013.01); *H04W 4/001* (2013.01); *G06F 17/30654* (2013.01); *H04L 41/509* (2013.01)

(58) Field of Classification Search
CPC ... H04L 41/5009; H04L 67/125; G06Q 10/10; G06Q 30/02; G06Q 30/0601; G06F 17/30867
USPC ............... 707/767, 732, 733, 734, 748, 751; 705/26.61, 26.62, 26.64, 26.7, 347, 346, 705/404, 409
See application file for complete search history.

(56) References Cited

U.S. PATENT DOCUMENTS

| | | | |
|---|---|---|---|
| 2003/0055670 A1* | 3/2003 | Kryskow et al. ................. 705/1 |
| 2004/0240390 A1* | 12/2004 | Seckin .......................... 370/252 |
| 2007/0100653 A1* | 5/2007 | Ramer et al. ..................... 705/1 |
| 2008/0201273 A1* | 8/2008 | Davis et al. .................. 705/400 |
| 2008/0201386 A1* | 8/2008 | Maharajh et al. ............ 707/201 |
| 2009/0216571 A1* | 8/2009 | Sunshine et al. ................ 705/5 |
| 2010/0094878 A1* | 4/2010 | Soroca et al. ................ 707/748 |
| 2010/0241625 A1* | 9/2010 | Aravamudan et al. ....... 707/734 |

* cited by examiner

*Primary Examiner* — Tony Mahmoudi
*Assistant Examiner* — Linh Black

(57) ABSTRACT

A device receives, from multiple user devices, event information associated with the multiple user devices, where the event information includes one or more actions, user information, content information, and one or more attributes. The device stores the event information in a database, and analyzes one or more portions of the event information stored in the database. The device also recommends, based on the analyzed event information, one or more adjustments to a network that delivers content to the multiple user devices.

16 Claims, 13 Drawing Sheets

FIG. 7

| Action | Action ID | Action Type |
|---|---|---|
| Buy | a010 | User selection |
| Play | a020 | User selection |
| Delete | a030 | User selection |
| Stop | a040 | Lost connection |

FIG. 8

| User ID | User Type | User Information |
|---|---|---|
| SSO ID | Smartphone user | Email address |
| MDN | Mobile phone user | Name |
| User Name | Tablet computer user | Home address |
| Login ID | Smartphone user | User demographics |

FIG. 9

| Content ID 910 | Content Type 920 | Content Title 930 | Content Description 940 |
|---|---|---|---|
| Movie ID | Movie | Movie title | Action movie |
| Television show ID | Television show | Television show name | Game show |
| Video content ID | Video content | Video name | Music video |
| Audio content ID | Audio content | Song name | MP3 of song |

950

900

1

MOBILE USER DATA COLLECTION

BACKGROUND

Video content (e.g., television shows, pay-per-view (PPV) content, video-on-demand (VOD) content, etc.) may be delivered and selected in several ways. For example, television channels may be broadcast to subscribers' homes (e.g., via a set-top box (STB)) and a channel may be viewed via subscriber selection from a channel lineup. Time shifted Internet protocol (IP) television (IPTV) emulates this broadcast delivery over IP, which overcomes bottlenecks associated with lower speed access networks by sending content during time periods when there is spare capacity, or sending content at a rate slower than the playback rate as constrained by an access network bandwidth.

Over the top (OTT), or IP unicast, delivery of video content may provide video content to any connected device (e.g., televisions, computers, gaming consoles, smartphones, etc.). OTT video content may include, for example, prerecorded video content (e.g., television episodes), and content associated with video portals provided by content providers, such as Hulu™, YouTube™, CNN, etc. As wireless network data rates improve using third generation (3G), fourth generation (4G), and WiFi technologies, video content, such as OTT video content, is becoming more popular with applications provided via smartphones (e.g., the Motorola DROID, the iPhone, etc.). Much of the video content provided by such content providers and/or applications is high bit rate content that is not optimized for wireless networks.

BRIEF DESCRIPTION OF THE DRAWINGS

FIG. 7 is a diagram of an example portion of an action table capable of being provided in and/or maintained by a data collection server depicted in FIG. 1;

FIG. 8 is a diagram of an example portion of a user table capable of being provided in and/or maintained by the data collection server of FIG. 1;

FIG. 9 is a diagram of an example portion of a content table capable of being provided in and/or maintained by the data collection server of FIG. 1;

DETAILED DESCRIPTION OF PREFERRED EMBODIMENTS

The following detailed description refers to the accompanying drawings. The same reference numbers in different drawings may identify the same or similar elements.

Systems and/or methods described herein may provide for collection of data associated with users of user devices (e.g., mobile phones, smartphones, STBs, etc.). The collected user data may include user usage patterns, feedback, interactions with a content provider, ratings, etc. The collected user data may be used to improve network delivery of content (e.g., video content), such as, for example, increasing bandwidth or expanding a network to reach the users demanding the content. Content providers may utilize the collected user data to make content recommendations to the users, to provide promotions to the users, to define or alter pricing charged for a product or service (e.g., content), etc. The improved network delivery of content and/or the content providers' use of the collected user data, in turn, may provide an improved user experience for the users of the user devices.

In one example implementation, the systems and/or methods may receive, via one or more mobile servers, event information from one or more user devices. The event information may include actions performed with the user device(s); information associated with user(s) of the user device(s); information associated with content retrieved, viewed, purchased, etc. by the user device(s); and attributes (e.g., time(s) content were retrieved, location information, device model(s), etc.) associated with the user device(s). The systems and/or methods may store the event information in a database, and may analyze one or more portions of the event information stored in the database. The systems and/or methods may recommend adjusting parameters of a network (e.g., a content delivery network) based on the analyzed event information, and may provide the analyzed event information to a content provider device. The content provider device may generate, based on the analyzed event information, one or more recommendations or one or more promotions for the user(s) of the user device(s), and/or may alter or define price(s) or a sales policy for products and/or services (e.g., content) based on the analyzed event information.

As used herein, the terms "user" or "customer" are intended to be broadly interpreted to include a user device or a user of a user device.

Figure 1:
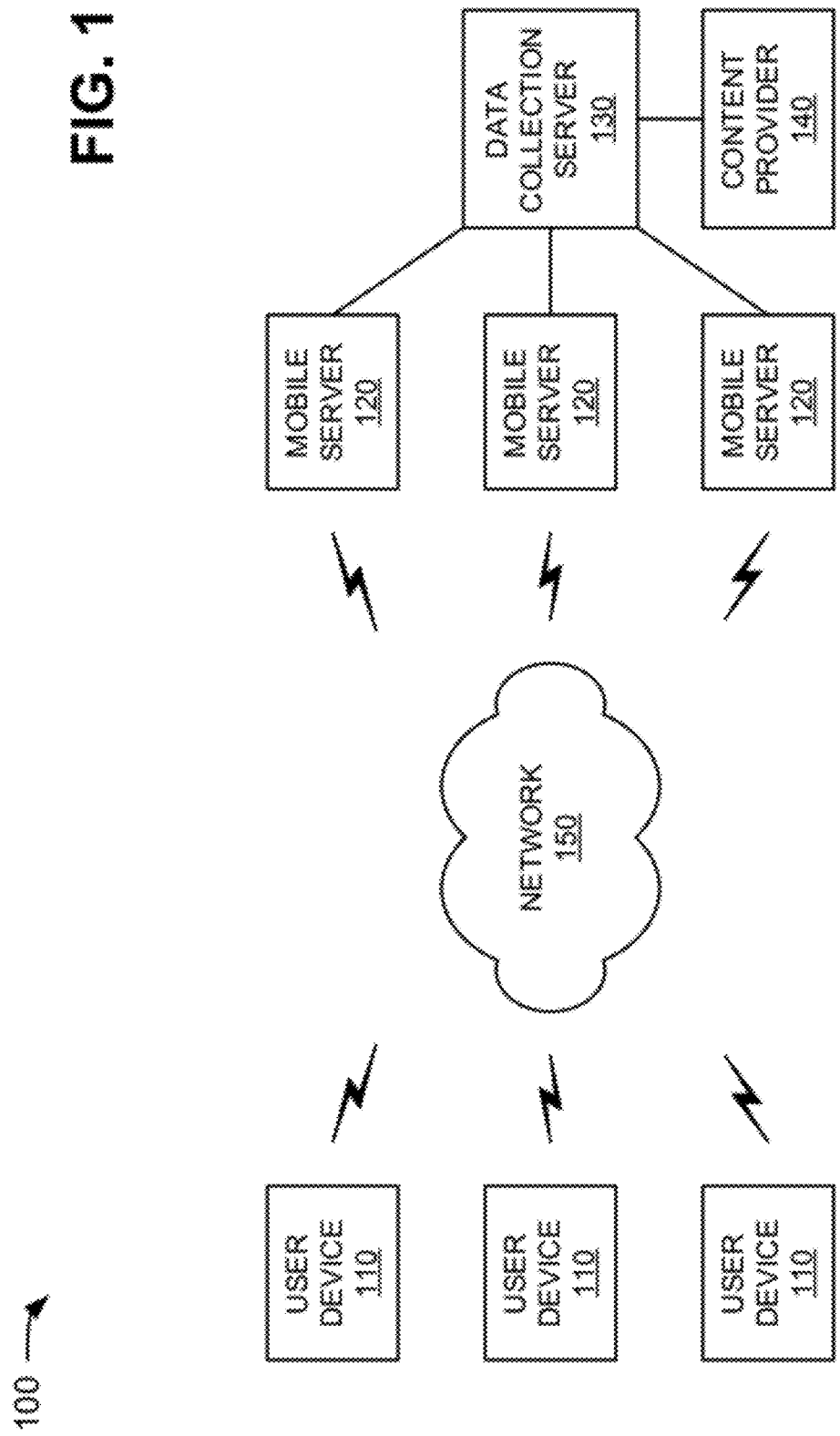
FIG. 1 is a diagram of an example network in which systems and/or methods described herein may be implemented.

FIG. 1 is a diagram of an example network 100 in which systems and/or methods described herein may be implemented. As illustrated, network 100 may include user devices 110, mobile servers 120, a data collection server 130, and a content provider 140 interconnected by a network 150. Components of network 100 may interconnect via wired and/or wireless connections. Three user devices 110, three mobile servers 120, one data collection server 130, one content provider 140, and one network 150 have been illustrated in FIG. 1 for simplicity. In practice, there may be more user devices 110, mobile servers 120, data collection servers 130, content providers 140, and/or networks 150. Also, in some instances, one or more of the components of network 100 may perform one or more functions described as being performed by another one or more of the components of network 100.

Each of user devices 110 may include any device that is capable of communicating with data collection server 130 and/or content provider 140 via mobile servers 120 and/or network 150. For example, user device 110 may include a mobile computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smartphone, a laptop computer (e.g., with a wireless air card), a global positioning system (GPS) device, a content recording device (e.g., a camera, a video camera, etc.), etc. In another example, user device 110 may include a fixed (e.g., provided in a particular location, such as within a user's home) computation and/or communication device, such as a laptop computer, a personal computer, a tablet computer, a STB, a television, a gaming system, etc.

In one example implementation, user device 110 may perform an event (e.g., play video content or audio content, download audio/video content, search for audio/video content, purchase audio/video content, etc. provided by content provider 140), and may generate event information based on performance of the event. The event information may include actions (e.g., play, download, search, etc.) performed with user device 110; information associated with a user of user device 110 (e.g., a user identifier (ID), an address of the user, etc.); information associated with content retrieved, viewed, purchased, etc. by user device 110 (e.g., a content ID); and attributes associated with user device 110 (e.g., a time content was retrieved by user device 110, a location of user device 110, a model of user device 110, etc.).

User device 110 may provide the event information (e.g., with a next server data call) to mobile server 120 (or directly to data collection server 130), and mobile server 120 may provide the event information to data collection server 130. In one example, and for privacy considerations, a user of user device 110 may need to agree to share the event information with data collection server 130. User device 110 may receive (e.g., from content provider 140) one or more recommendations or promotions based on the provided event information. For example, if user device 110 purchased an action movie, content provider 140 may recommend or promote other action movies to user device 110 (e.g., based on the purchase of the action movie). User device 110 may also receive (e.g., from content provider 140) an altered pricing, product, and/or service mix based on the provided event information. For example, if user device 110 downloaded a song, content provider may reduce or increase the price of the song (e.g., based on the downloading of the song) when it is subsequently downloaded.

Mobile server 120 may include one or more server devices, or other types of computation or communication devices, that gather, process, search, and/or provide information in a manner described herein. In one example implementation, mobile server 120 may receive an indication of an event (e.g., playing, downloading, purchasing, etc. content provided by content provider 140) from user device 110, and may extract event information (e.g., actions, user information, content information, and/or attributes) from the event. Alternatively, user device 110 may generate the event information, and mobile server 120 may directly receive the event information from user device 110 (e.g., rather than extracting the event information from an event). Mobile server 120 may provide the event information to data collection server 130 for storage.

In one example, mobile server 120 may collect the event information from user device 110 (or extract the event information), and may provide the event information to data collection server 130 with a regular server data call. In other words, mobile server 120 may piggyback the event information with other information provided via a regular server data call. Such an arrangement may conserve bandwidth and may minimize data transferred between mobile server 120 and data collection server 130. In one implementation, mobile server 120 may store the event information (e.g., until the event is completed), and then may generate a single server data call or a minimum number of server data calls (e.g., with the stored event information) to data collection server 130. In another example, mobile server 120 may provide the event information to data collection server 130 in real time (e.g., so that the event information may be utilized in real time).

Data collection server 130 may include one or more server devices, or other types of computation or communication devices, that gather, process, search, and/or provide information in a manner described herein. In one example implementation, data collection server 130 may receive event information (e.g., associated with user devices 110) from mobile servers 120 or directly from user devices 110. As described above, data collection server 130 may receive the event information from each of mobile servers 120 via a regular server data call. In other words, each of mobile servers 120 may piggyback the event information with other information provided via a regular server data call.

In one example implementation, data collection server 130 may receive, via one or more mobile servers 120, event information from one or more user devices 110, and may store the event information in a database provided in data collection server 130 (or separate from data collection server 130). Data collection server 130 may analyze one or more portions of the event information stored in the database, may recommend adjusting parameters of a network (e.g., network 150) based on the analyzed event information, and may provide the analyzed event information to content provider 140. Content provider 140 may generate, based on the analyzed event information, one or more recommendations or one or more promotions for the users of user devices 110, and/or may alter or define prices or a sales policy for products and/or services (e.g., content) based on the analyzed event information.

Content provider 140 may include one or more server devices, or other types of computation or communication devices, that gather, process, search, and/or provide information in a manner described herein. In one example, content provider 140 may include a computer system, an application, a cable head-end, and/or a broadcasting device capable of providing video content (e.g., video on demand (VOD) content, high definition (HD)-VOD content, television programming, movies, on-demand services, live television, OTT content, etc.) in a variety of formats; audio content in a variety of formats; commercials; advertisements; instructions; recommendations; promotions; and/or other information. In one example implementation, content provider 140 may receive analyzed event information from data collection server 130. Content provider 140 may generate, based on the analyzed event information, one or more recommendations or one or more promotions for the users of user devices 110, and/or may alter or define prices or a sales policy for products and/or services (e.g., content) based on the analyzed event information.

Network 150 may include a local area network (LAN), a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of networks. In one example implementation, network 150 may include a content delivery network that enables user devices 110 to send content (e.g., to other user devices 110), to retrieve content from content provider 140, etc.

Although FIG. 1 shows example components of network 100, in other implementations, network 100 may contain fewer components, different components, differently arranged components, or additional components than depicted in FIG. 1.

Figure 2:
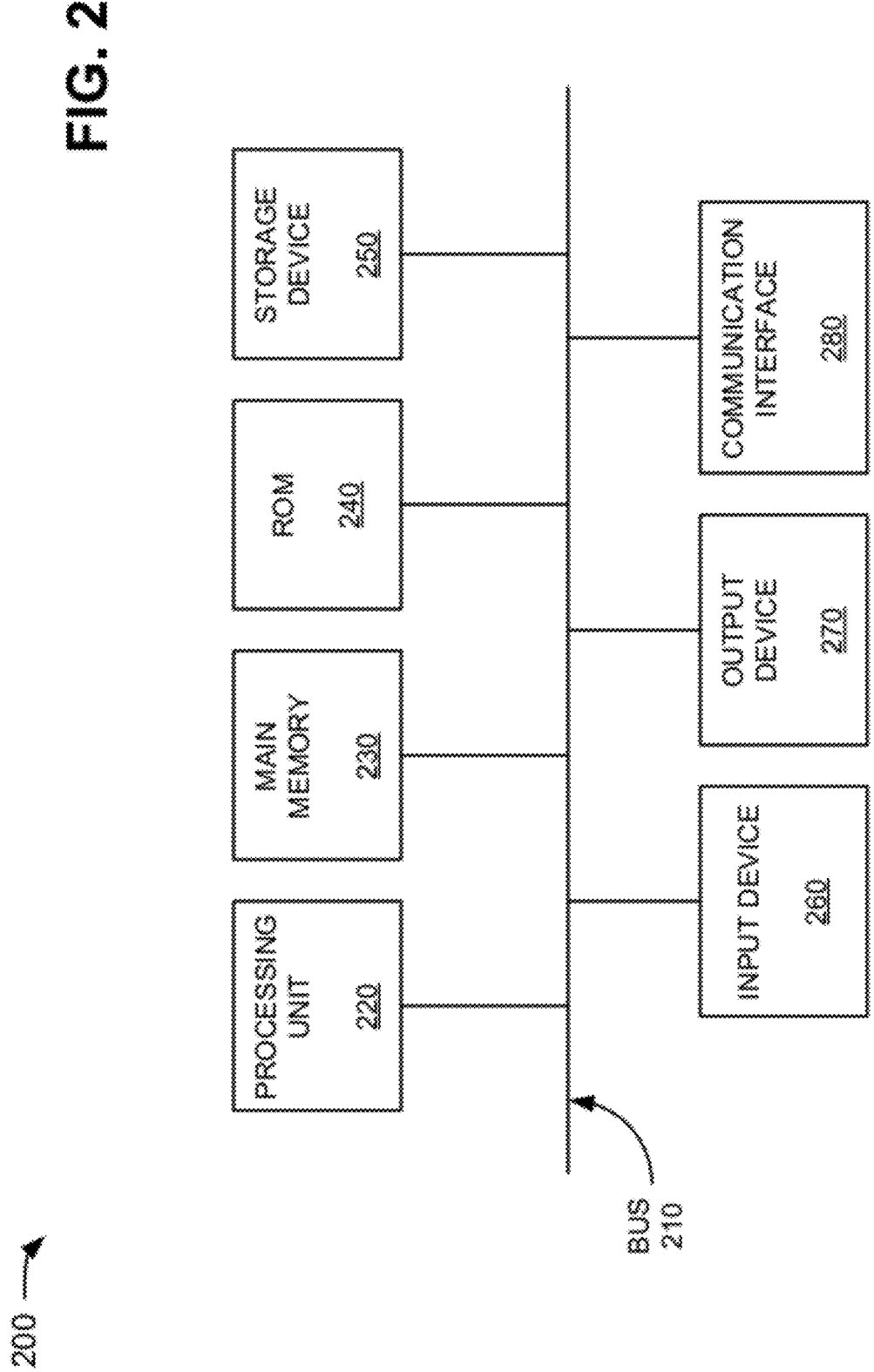
FIG. 2 is a diagram of example components of one or more devices of the network depicted in FIG. 1.

FIG. 2 is a diagram of example components of a device 200 that may correspond to one or more devices of network 100. As illustrated, device 200 may include a bus 210, a processing unit 220, a main memory 230, a read-only memory (ROM) 240, a storage device 250, an input device 260, an output device 270, and a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. In still other implementations, one or more components of device 200 may perform one or more other tasks described as being performed by one or more other components of device 200.

Figure 3:
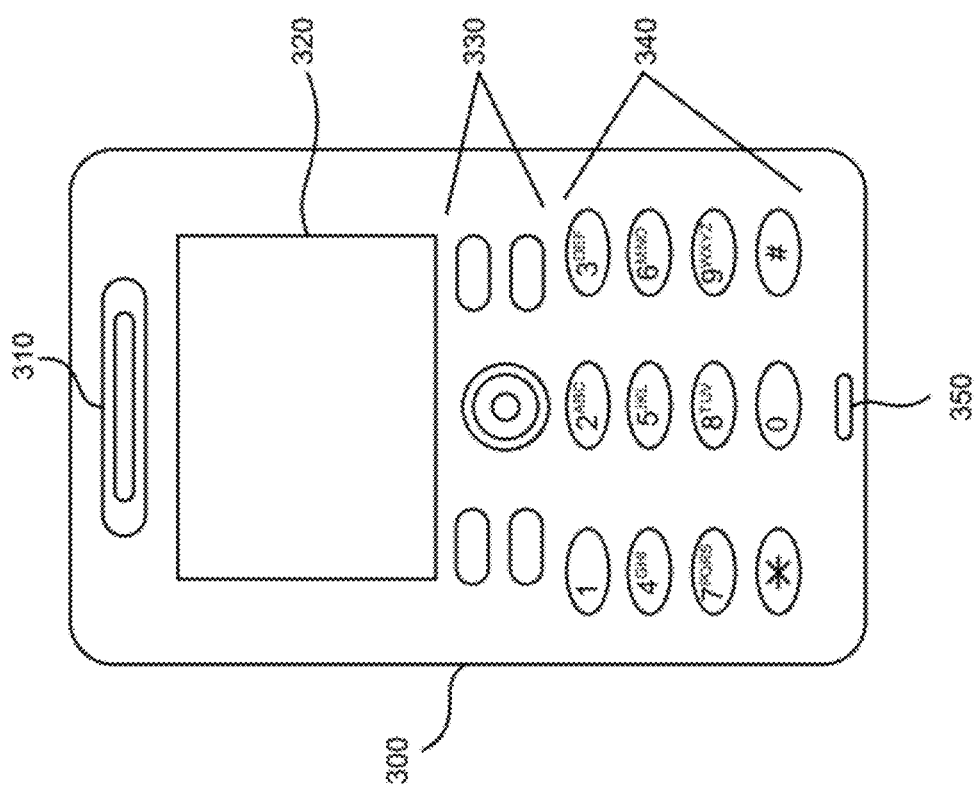
FIG. 3 is a diagram of an example user device of the network illustrated in FIG. 1.

FIG. 3 is a diagram of an example user device 110 (e.g., a mobile communication device). As illustrated, user device 110 may include a housing 300, a speaker 310, a display 320, control buttons 330, a keypad 340, and a microphone 350. Housing 300 may protect the components of user device 110 from outside elements. Speaker 310 may provide audible information to a user of user device 110.

Display 320 may provide visual information to the user. For example, display 320 may display text input into user device 110; text, images, video, and/or graphics received from another device; and/or information regarding incoming or outgoing calls or text messages, emails, media, games, phone books, address books, the current time, etc. In one example implementation, display 320 may include a touch screen display that may be configured to receive a user input when the user touches display 320. For example, the user may provide an input to display 320 directly, such as via the user's finger, or via other input objects, such as a stylus. User inputs received via display 320 may be processed by components and/or devices operating in user device 110. The touch screen display may permit the user to interact with user device 110 in order to cause user device 110 to perform one or more operations described herein. Exemplary technologies to implement a touch screen on display 320 may include, for example, a near-field-sensitive (e.g., capacitive) overlay, an acoustically-sensitive (e.g., surface acoustic wave) overlay, a photo-sensitive (e.g., infrared) overlay, a pressure sensitive (e.g., resistive) overlay, and/or any other type of touch panel overlay that allows display 320 to be used as an input device. The touch-screen-enabled display 320 may also identify movement of a body part or a pointing device as it moves on or near the surface of the touch-screen-enabled display 320.

Control buttons 330 may permit the user to interact with user device 110 to cause user device 110 to perform one or more operations. For example, control buttons 330 may be used to cause user device 110 to transmit information. Keypad 340 may include a standard telephone keypad. In one example implementation, control buttons 330 and/or keypad 340 may be omitted, and the functionality provided by control buttons 330 and/or keypad 340 may be provided by display 320 (e.g., via a touch screen display). Microphone 350 may receive audible information from the user.

Although FIG. 3 shows example components of user device 110, in other implementations, user device 110 may contain fewer components, different components, differently arranged components, or additional components than depicted in FIG. 3. In still other implementations, one or more components of user device 110 may perform one or more other tasks described as being performed by one or more other components of user device 110.

Figure 4:
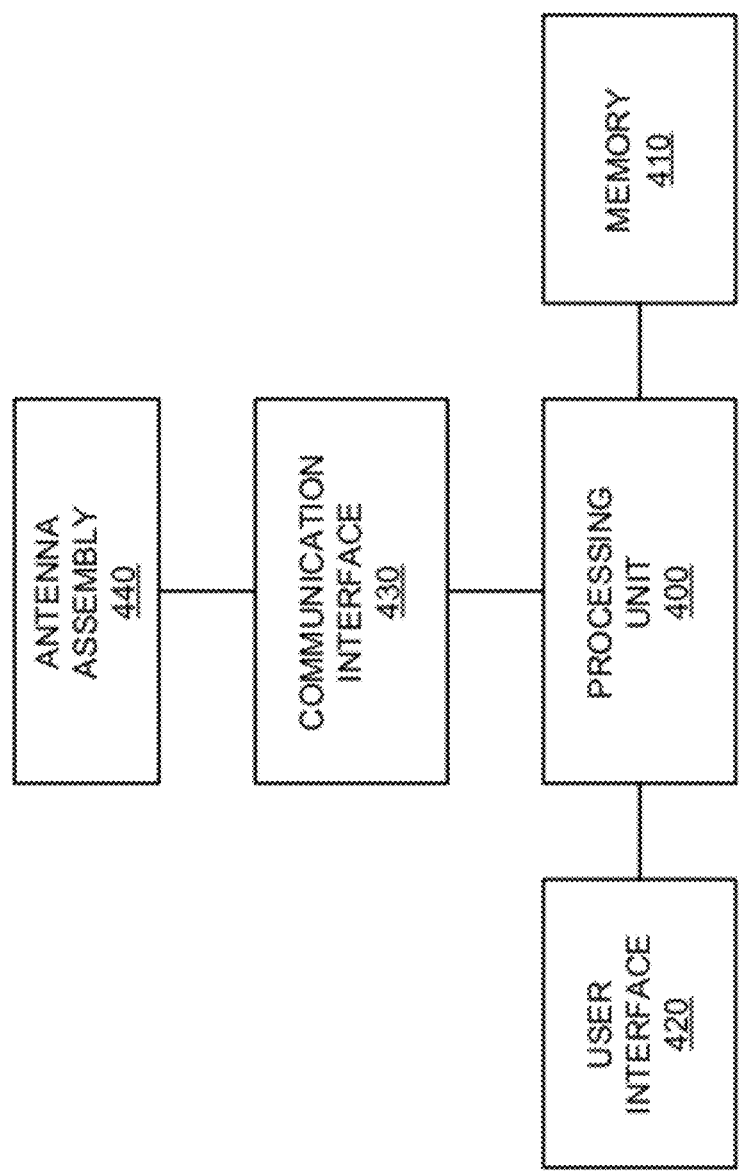
FIG. 4 is a diagram of example components of the user device depicted in FIG. 3.

FIG. 4 is a diagram of example components of user device 110. As shown, user device 110 may include a processing unit 400, memory 410, a user interface 420, a communication interface 430, and an antenna assembly 440. Components of user device 110 may interconnect via wired and/or wireless connections.

Processing unit 400 may include one or more processors, microprocessors, application specific integrated circuits (ASICs), field programmable gate arrays (FPGAs), or the like. Processing unit 400 may control operation of user device 110 and its components in a manner described herein.

Memory 410 may include a RAM, a ROM, and/or another type of memory to store data and instructions that may be used by processing unit 400.

User interface 420 may include mechanisms for inputting information to user device 110 and/or for outputting information from user device 110. Examples of input and output mechanisms might include buttons (e.g., control buttons 330, keys of keypad 340, a joystick, etc.) or a touch screen interface to permit data and control commands to be input into user device 110; a speaker (e.g., speaker 310) to receive electrical signals and output audio signals; a microphone (e.g., microphone 350) to receive audio signals and output electrical signals; a display (e.g., display 320) to output visual information (e.g., text input into user device 110); and/or a vibrator to cause user device 110 to vibrate.

Communication interface 430 may include, for example, a transmitter that may convert baseband signals from processing unit 400 to radio frequency (RF) signals and/or a receiver that may convert RF signals to baseband signals. Alternatively, communication interface 430 may include a transceiver to perform functions of both a transmitter and a receiver. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one implementation, for example, communication interface 430 may communicate with a network and/or devices connected to a network.

As described herein, user device 110 may perform certain operations described herein in response to processing unit 400 executing software instructions of an application contained in a computer-readable medium, such as memory 410. The software instructions may be read into memory 410 from another computer-readable medium or from another device via communication interface 430. The software instructions contained in memory 410 may cause processing unit 400 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows example components of user device 110, in other implementations, user device 110 may contain fewer components, different components, differently arranged components, or additional components than depicted in FIG. 4. In still other implementations, one or more components of user device 110 may perform one or more other tasks described as being performed by one or more other components of user device 110.

Figure 5:
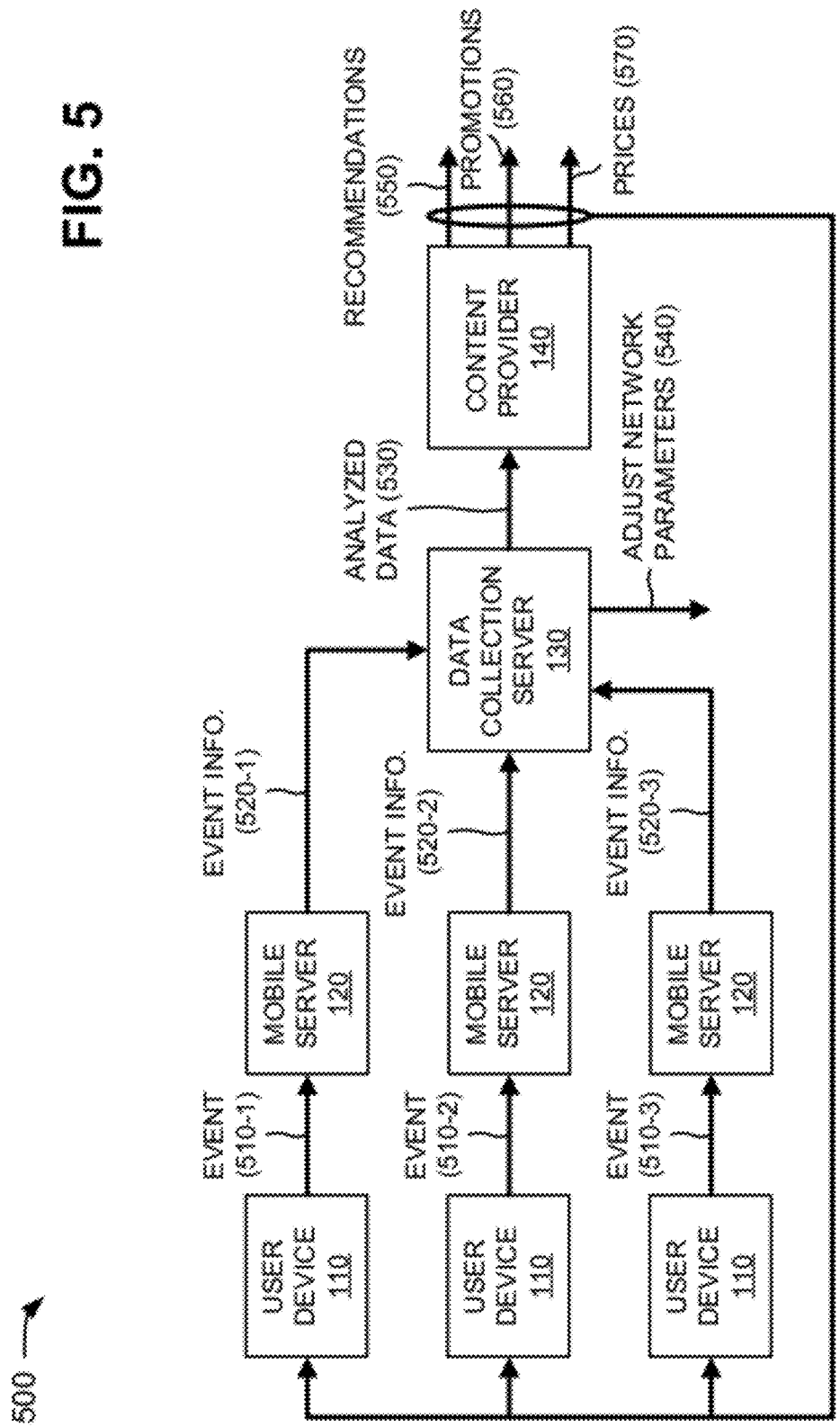
FIG. 5 is a diagram of example operations capable of being performed by an example portion of the network illustrated in FIG. 1.

FIG. 5 is a diagram of example operations capable of being performed by an example portion 500 of network 100. As shown, example network portion 500 may include user devices 110, mobile servers 120, data collection server 130, and content provider 140. User devices 110, mobile servers 120, data collection server 130, and content provider 140 may include the features described above in connection with, for example, one or more of FIGS. 1-4.

As further shown in FIG. 5, user devices 110 may generate events 510-1, 510-2, and 510-3 (collectively referred to herein as "events 510" and singularly as "event 510"), and may provide events 510 to respective mobile servers 120. Event 510 may include a function (e.g., associated with content provided by content provider 140) performed by user device 110, such as downloading a movie, obtaining a license for content, streaming a movie trailer, watching a live television shown, watching OTT video content, downloading a song, listening to a song, purchasing content, etc. In one example implementation, user devices 110 may implement application programming interfaces (APIs) that generate events 510.

Mobile servers 120 may receive events 510-1, 510-2, and 510-3 and may extract event information 520-1, 520-2, and 520-3 (collectively referred to herein as "event information 520" and singularly as "event information 520") from events 510-1, 510-2, and 510-3, respectively. In one example implementation, mobile servers 120 may implement APIs that extract event information 520 from events 510. Alternatively, user devices 110 may generate event information 520 (via the APIs of user devices 110), and mobile servers 120 may directly receive event information 520 from user devices 110 (e.g., rather than extracting event information 520 from events 510). Even information 520 can also be directly sent from mobile user devices 110 to data collection server 130. Event information 520 may include actions (e.g., play, download, search, stop, pause, etc.) performed with user devices 110; information associated with users of user devices 110 (e.g., user IDs, home addresses of the users, email addresses of the users, etc.); information associated with content retrieved, viewed, purchased, streamed, etc. by user devices 110 (e.g., content IDs, content types, content titles, content descriptions, etc.); and attributes associated with user devices 110 (e.g., times content were retrieved by user devices 110, locations of user devices 110, types of user devices 110, etc.). For example, if event 510 includes user A playing video B at 8:00 AM on Aug. 30, 2010 in New York City using a DROID mobile device, event information 520 may include actions (e.g., playing video B), user information (e.g., user A information), content information (e.g., video B), and attributes (e.g., 8:00 AM on Aug. 30, 2010 (time information) in New York City (location information) using a DROID (type of user device 110)). Mobile servers 120 may provide event information 520-1, 520-2, and 520-3 to data collection server 130.

Data collection server 130 may receive event information 520-1, 520-2, and 520-3 from mobile servers 120, and may store event information 520 in a database provided in data collection server 130 (or separate from data collection server 130). In one example implementation, data collection server 130 may provide the actions associated with event information 520 in an action table of the database, may provide the user information associated with event information 520 in a user table of the database, may provide content information associated with event information 520 in a content table of the database, and may provide attributes of event information 520 in an attribute table of the database. Further details of the action table, user table, content table, and attribute table are provided below in connection with, for example, FIGS. 7-10. In one example implementation, data collection server 130 may add information to the database in real time, and may permit the information in the database to be accessed (e.g., by content provider 140) in real time. Real time access of the information in the database may permit content provider 140 to interact with the users of user devices 110 (e.g., to provide recommendations, promotions, etc. based on the information) in real time.

Data collection server 130 may analyze one or more portions of event information 520 stored in the database, and may produce analyzed data 530 (e.g., analyzed event information 520) based on the analysis. Analyzed data 530 may provide a variety of information, such as, for example, how many user devices 110 utilize content provided by content provider 140; how many times content (e.g., a video) was previewed during the last hour by how many user devices 110 and how many users purchased or rented the content; which content was played in which geographic areas and for how long was it played; how many users used a user device 110 application during the last hour and what are the top ten activities performed by users; how many times a particular function (e.g., function x) of user device 110 was used (e.g., as compared to other user device 110 functions); how many searches were performed by user devices 110; how many times were items selected from a successful search result (e.g., users found what they were looking for); how many video products were "added to a shopping cart" but not purchased via user devices 110; real time content demands placed on network 100 by user devices 110; etc.

As further shown in FIG. 5, data collection server 130 may provide analyzed data 530 to content provider 140, and may recommend adjusting parameters of a network (e.g., network 150) based on analyzed data 530, as indicated by reference number 540. For example, based on analyzed data 530, data collection server 130 may recommend increasing a bandwidth of network 150; adding network resources (e.g., wireless towers) to network 150; shifting content to a nearest edge storage device (e.g., to decrease retrieval time by user devices 110); streaming and/or downloading content using different bit rates from content provider 140 (e.g., adaptive content delivery) while adjusting and/or increasing network bandwidth as necessary.

Content provider 140 may receive analyzed data 530 from data collection server 130, and may generate, based on analyzed data 530, one or more recommendations 550 or one or more promotions 560 for the users of user devices 110, and/or may alter or define prices or a sales policy for products and/or services (e.g., content), as indicated by reference number 570. Content provider 140 may provide recommendations 550, promotions 560, and prices 570 for products or services to one or more user devices 110. Recommendations 550 may include, for example, personalized recommendations (e.g., recommendations based on a user's past behavior—"Just for you"), social recommendations (e.g., recommendations based on past behavior of similar users—"Other people like you have also bought these"), and/or item recommendations (e.g., recommendations based on particular content—"People who bought this have also bought these"). Promotions 560 may include, for example, advertisements for content, special offers for certain users, etc. Prices 570 may include increasing and/or decreasing prices of content provided to user devices 110, altering the types of content offered to user devices 110, etc.

Although FIG. 5 shows example components of network portion 500, in other implementations, network portion 500 may contain fewer components, different components, differently arranged components, or additional components than depicted in FIG. 5. In still other implementations, one or more components of network portion 500 may perform one or more other tasks described as being performed by one or more other components of network portion 500.

Figure 6:
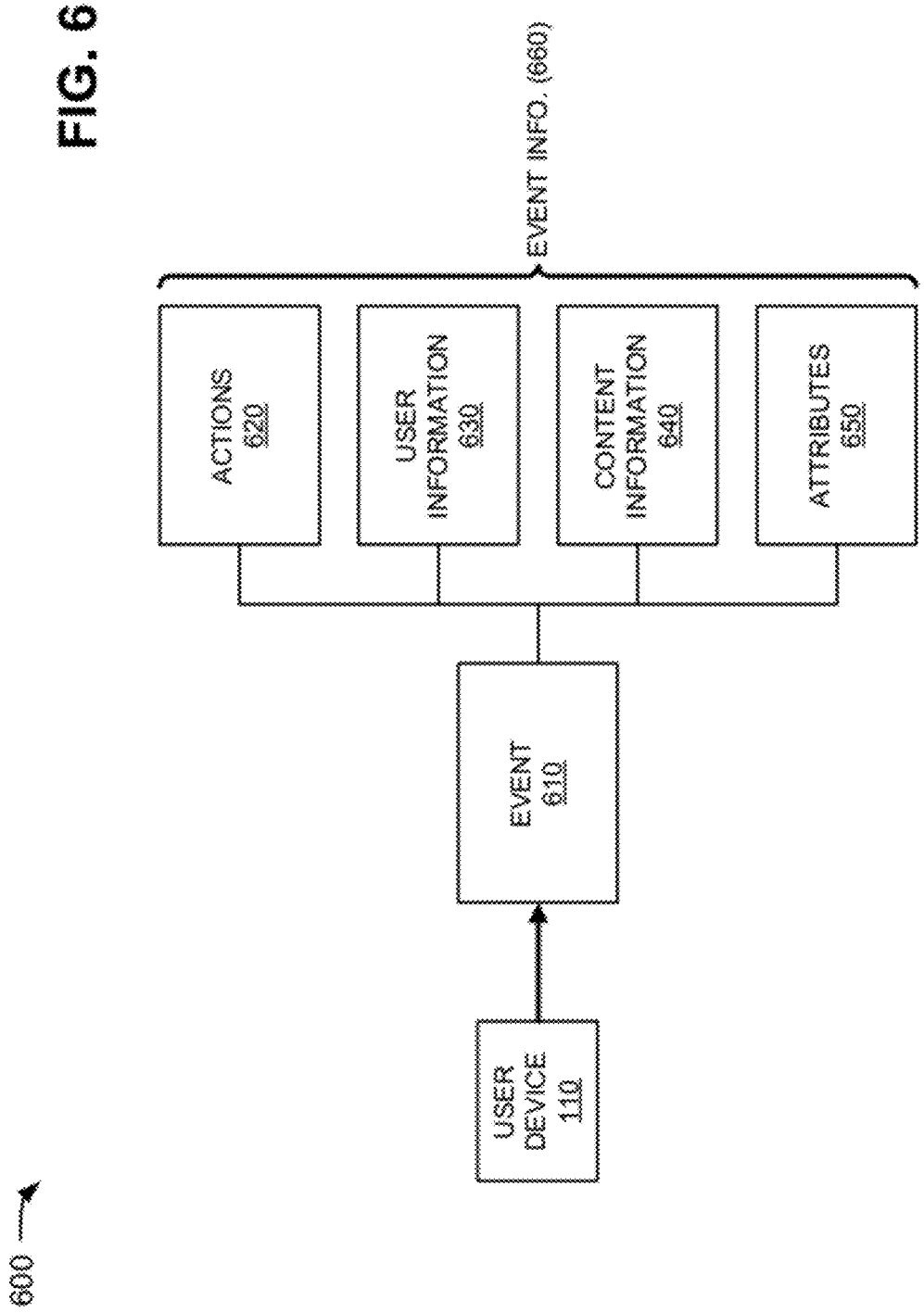
FIG. 6 is a diagram of an example event capable of being generated by one of the user devices of FIG. 1.

FIG. 6 is a diagram 600 of an example event 610 capable of being generated by one of user devices 110. Event 610 may include a function (e.g., associated with content provided by content provider 140) performed by user device 110, such as downloading a movie, obtaining a license for content, streaming a movie trailer, watching a live television shown, watching OTT video content, downloading a song, listening to a song, purchasing content, etc. As shown in FIG. 6, event 610 may include actions 620, user information 630, content information 640, and attributes 650. In one example implementation, actions 620, user information 630, content information 640, and attributes 650 may correspond to event information 660 that is extracted from event 610 (e.g., by user device 110 and/or by mobile server 120).

Actions 620 may include actions or functions performed with user device 110. For example, actions 620 may include playing, downloading, searching, stopping, pausing, streaming, purchasing, deleting, etc. content with user device 110. In another example, actions 620 may include user device 110 losing a connection (e.g., to network 150) during content streaming. In still another example, actions 620 may include usage rates by user device 110, feedback provided by users of user device 110, content ratings provided by users of user device 110, etc.

User information 630 may include information associated with a user of user device 110. For example, user information 630 may include a user ID (e.g., a mobile directory number (MDN), a single sign on (SSO) login, etc.), a user type (e.g., a smartphone user, a STB user, a tablet computer user, etc.), a home address of the user, an email address of the user, a name of the user, demographics of the user, etc.

Content information 640 may include information associated with content upon which actions 620 are performed by user device 110. For example, content information 640 may include a content ID (e.g., a cable television ID, a movie ID, etc.), a content type (e.g., a movie, a television shown, a song, etc.), a content title (e.g., a movie title, a television show title, a song name, etc.), a content description (e.g., an action movie, a soap opera, an MP3 of a song, etc.), etc.

Attributes 650 may include attributes associated with user device 110 when actions 620 are performed by user device 110. For example, attributes 650 may include a time when content is retrieved by user device 110 (e.g., Oct. 10, 2006 at 6:30 AM), a time elapsed between actions 620 (e.g., user device 110 plays a video for thirty seconds), a location of user device 110 (e.g., a latitude and longitude of user device 110), a type of user device 110 (e.g., a smartphone, a STB, a cell phone, a tablet computer, etc.), etc.

Although FIG. 6 shows example information that may be provided in event 610, in other implementations, event 610 may contain less information, different information, or additional information than depicted in FIG. 6.

FIG. 7 is a diagram of an example portion of an action table 700 capable of being provided in and/or maintained by data collection server 130. As illustrated, action table 700 may include a variety of information associated with actions (e.g., actions 620) performed with user devices 110. For example, action table 700 may include an action field 710, an action ID field 720, an action type field 730, and/or a variety of entries 740 associated with fields 710-730.

Action field 710 may include actions or functions performed with user devices 110. For example, as shown in FIG. 7, action field 710 may include a buy action (e.g., buying a movie with user device 110), a play action (e.g., playing a movie with user device 110), a delete action (e.g., deleting a movie with user device 110), and a stop action (e.g., losing a connection during video streaming by user device 110).

Action ID field 720 may include an identifier associated with an action provided in action field 710. For example, as shown in FIG. 7, action ID field 720 may include "a010" as an identifier for the buy action, "a020" as an identifier for the play action, "a030" as an identifier for the delete action, and "a040" as an identifier for the stop action.

Action type field 730 may include a type of action provided in action field 710. For example, as shown in FIG. 7, action type field 730 may designate the buy action as a type of user selection (e.g., the user of user device 110 bought the movie via a selection mechanism, such as an icon displayed on user device 110), may designate the play action as a type of user selection, may designate the delete action as a type of user selection, and may designate the stop action as a type of lost connection.

Although FIG. 7 shows example information that may be provided in action table 700, in other implementations, action table 700 may contain less information, different information, or additional information than depicted in FIG. 7.

FIG. 8 is a diagram of an example portion of a user table 800 capable of being provided in and/or maintained by data collection server 130. As illustrated, user table 900 may include a variety of information (e.g., user information 630) associated with users of user devices 110. For example, user table 800 may include a user ID field 810, a user type field 820, a user information field 830, and/or a variety of entries 840 associated with fields 810-830.

User ID field 810 may include identifiers associated with users of user devices 110. For example, as shown in FIG. 8, user ID field 810 may include a SSO ID of a user of user device 110, a MDN associated with user device 110, a user name of a user of user device 110, and a login ID of a user of user device 110. User ID filed 810 can be hashed using a Message-Digest algorithm 5 (MD5) cryptographic hash function, for example, to protect user privacy. The hashing of user ID field 810 may be performed by user devices 110 or by data collection server 130 before saving the data to a database (e.g., user table 800).

User type field 820 may include a type of user identified in user ID field 810. For example, as shown in FIG. 8, user type field 820 may indicate that the user associated with the SSO ID (e.g., provided in user ID field 810) is a smartphone user, that the user associated with the MDN (e.g., provided in user ID field 810) is a mobile phone user, that the user associated with the user name (e.g., provided in user ID field 810) is a tablet computer user, and that the user associated with the login ID (e.g., provided in user ID field 810) is a smartphone user.

User information field 830 may include information associated with the user identified in user ID field 810. For example, as shown in FIG. 8, user information field 830 may provide an email address of the user associated with the SSO ID (e.g., provided in user ID field 810), may provide a name of the user associated with the MDN (e.g., provided in user ID field 810), may provide a home address of the user associated with the user name (e.g., provided in user ID field 810), and may provide demographics of the user associated with the login ID (e.g., provided in user ID field 810).

Although FIG. 8 shows example information that may be provided in user table 800, in other implementations, user table 800 may contain less information, different information, or additional information than depicted in FIG. 8.

FIG. 9 is a diagram of an example portion of a content table 900 capable of being provided in and/or maintained by data collection server 130. As illustrated, content table 900 may include a variety of information (e.g., content information 640) associated with content upon which actions (e.g., actions 620) are performed by user devices 110. For example, content table 900 may include a content ID field 910, a content type field 920, a content title field 930, a content description field 940, and/or a variety of entries 950 associated with fields 910-940.

Content ID field 910 may include identifiers associated with content upon which actions are performed by user devices 110. For example, as shown in FIG. 9, content ID field 910 may include a movie ID, a television show ID, a video content ID, and an audio content ID.

Content type field 920 may include a type of content identified in content ID field 910. For example, as shown in FIG. 9, content type field 920 may indicate that the movie ID (e.g., provided in content ID field 910) is associated with a movie, that the television show ID (e.g., provided in content ID field 910) is associated with a television show, that the video content ID (e.g., provided in content ID field 910) is associated with video content, and that the audio content ID (e.g., provided in content ID field 910) is associated with audio content.

Content title field 930 may include a title of the content identified in content ID field 910. For example, as shown in FIG. 9, content title field 930 may include a movie title for the movie ID (e.g., provided in content ID field 910), a television show name for the television show ID (e.g., provided in content ID field 910), a video name for the video content ID (e.g., provided in content ID field 910), and a song name for the audio content ID (e.g., provided in content ID field 910).

Content description field 940 may include a description of the content identified in content ID field 910. For example, as shown in FIG. 9, content description field 940 may describe the movie ID (e.g., provided in content ID field 910) as an action movie, may describe the television show ID (e.g., provided in content ID field 910) as a game show, may describe the video content ID (e.g., provided in content ID field 910) as a music video, and may describe the audio content ID (e.g., provided in content ID field 910) as a MP3 of a song.

Although FIG. 9 shows example information that may be provided in content table 900, in other implementations, content table 900 may contain less information, different information, or additional information than depicted in FIG. 9.

Figure 10:
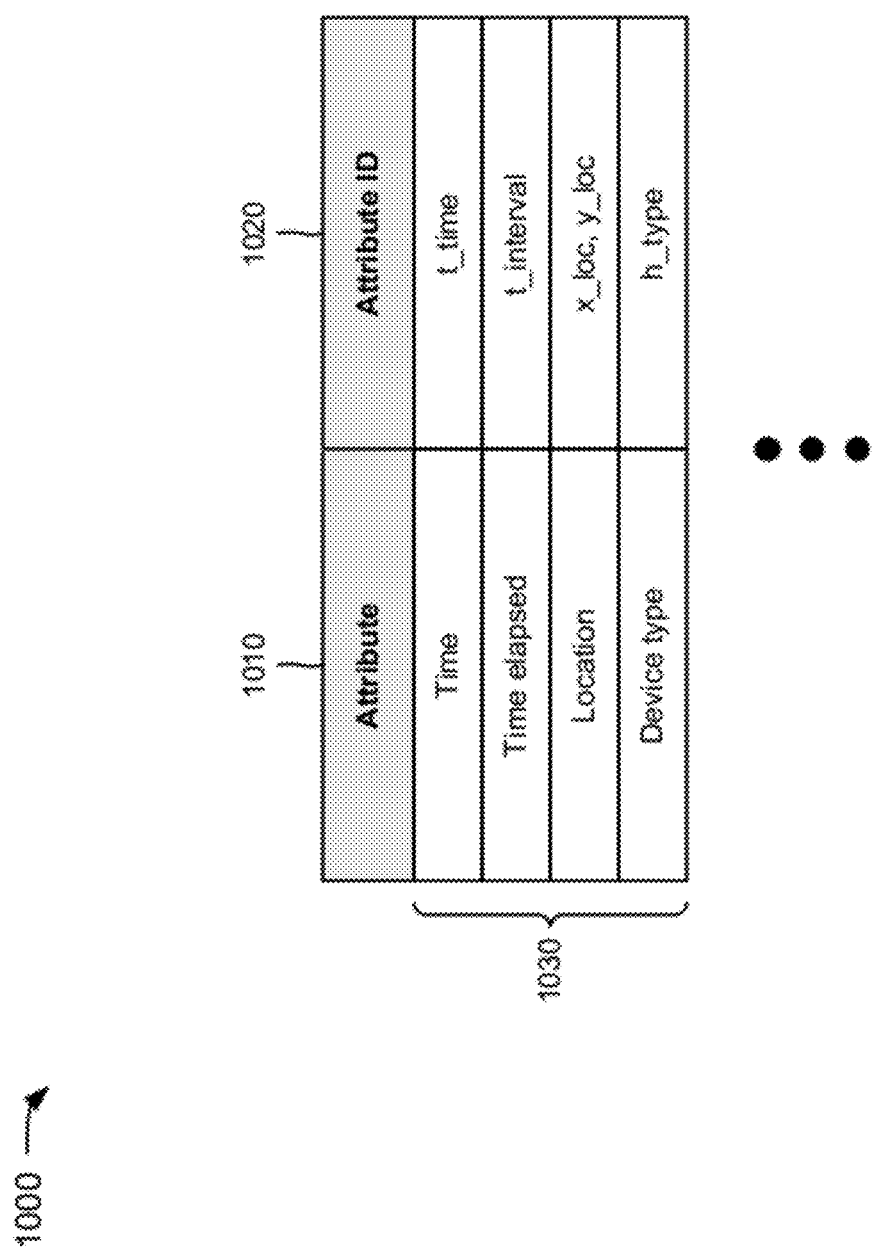
FIG. 10 is a diagram of an example portion of an attribute table capable of being provided in and/or maintained by the data collection server of FIG. 1.

FIG. 10 is a diagram of an example portion of an attribute table 1000 capable of being provided in and/or maintained by data collection server 130. As illustrated, attribute table 1000 may include a variety of attributes (e.g., attributes 650) associated with user devices 110 when actions (e.g., actions 620) are performed by user devices 110. For example, attribute table 1000 may include an attribute field 1010, an attribute ID field 1020, and/or a variety of entries 1030 associated with fields 1010 and 1020.

Attribute field 1010 may include attributes associated with user devices 110 when actions 620 are performed by user device 110. For example, as shown in FIG. 10, attribute field 1010 may include a "Time" attribute (e.g., a time when content is retrieved by user device 110, such as Nov. 20, 2006 at 8:30 PM), a "Time elapsed" attribute (e.g., a time elapsed between actions 620, such as user device 110 plays a song for fifty seconds), a "Location" attribute (e.g., a location of user device 110, such as a latitude and longitude of user device 110), and a "Device type" attribute (e.g., a type of user device 110, such as a smartphone, a mobile phone, a tablet computer, etc.).

Attribute ID field 1020 may include an identifier associated with an attribute provided in attribute field 1010. For example, as shown in FIG. 10, attribute ID field 1020 may include "t_time" as an identifier for the "Time" attribute, "t_interval" as an identifier for the "Time elapsed" attribute, "x_loc" and "y_loc" as identifiers for the "Location" attribute, and "h_type" as an identifier for the "Device type" attribute.

Although FIG. 10 shows example information that may be provided in attribute table 1000, in other implementations, attribute table 1000 may contain less information, different information, or additional information than depicted in FIG. 10.

Figure 11:
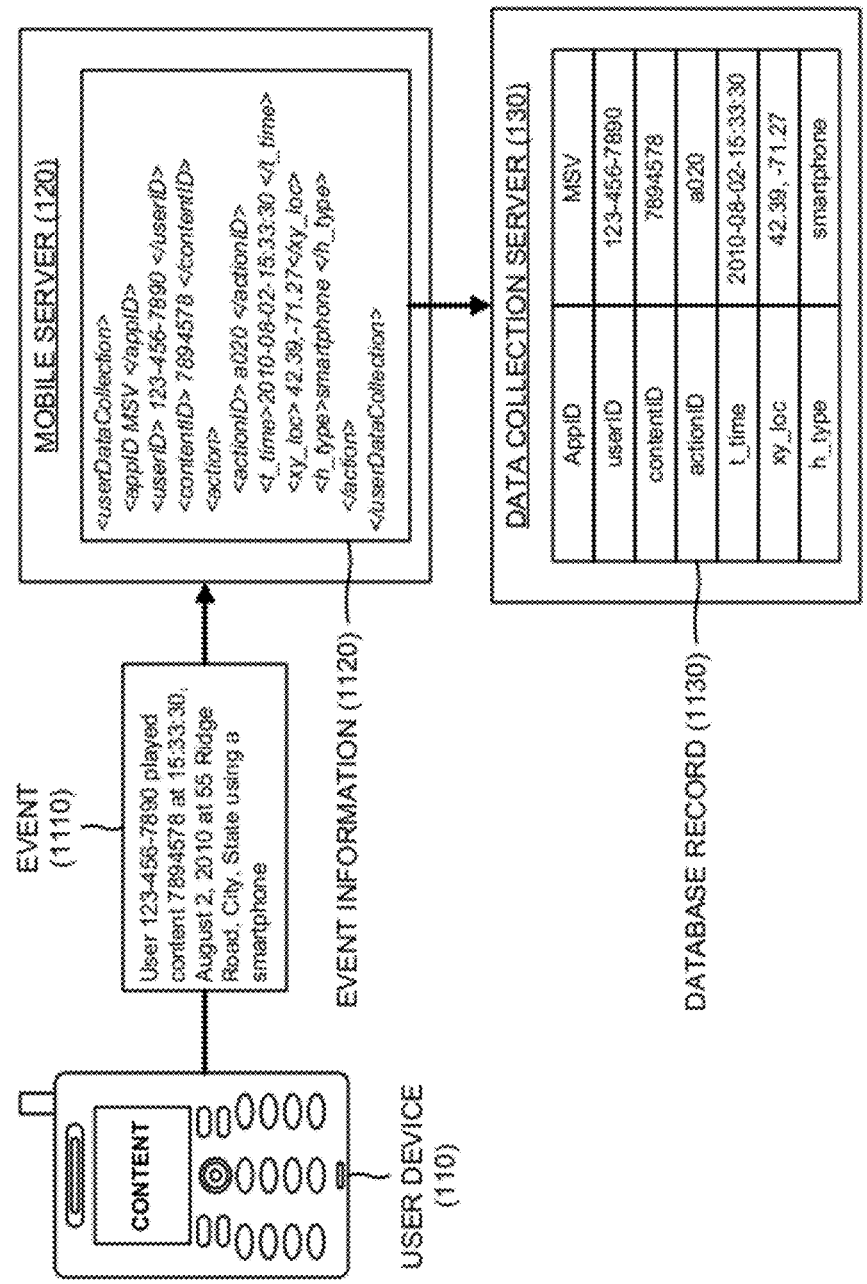
FIG. 11 is a diagram of example operations capable of being performed by another example portion of the network illustrated in FIG. 1.

FIG. 11 is a diagram of example operations capable of being performed by another example portion 1100 of network 100. As shown, example network portion 1100 may include user device 110 (e.g., a smartphone), mobile server 120, and data collection server 130. User device 110, mobile server 120, and data collection server 130 may include the features described above in connection with, for example, one or more of FIGS. 1-10.

As further shown in FIG. 11, a user of user device 110 may perform a function with user device 110. For example, the user may be identified by a MDN (e.g., "123-456-7890") of user device 110 and may instruct user device 110 to play content (e.g., content "7894578"). User device 110 may play the content at a certain time (e.g., at "15:33:30 on Aug. 2, 2010") and may be located at a certain place (e.g., "55 Ridge Road, City, State"). Based on this scenario, user device 110 (e.g., an API of user device 110) may generate an event 1110 that indicates that "user 123-456-7890 played content 7894578 at 15:33:30, Aug. 2, 2010 at 55 Ridge Road, City, State using a smartphone."

User device 110 may provide event 1110 to mobile server 120, and mobile server 120 may extract event information 1120 from event 1110. In one example implementation, mobile server 120 may implement an API that extracts event information 1120 from event 1110. Alternatively, user device 110 may generate event information 1120 (via the API of user device 110), and mobile server 120 may directly receive event information 1120 from user device 110 (e.g., rather than extracting event information 1120 from event 1110). In one example, user device 110 may provide event 1110 (or event information 1120) to mobile server 120 with a regular server data call. In other words, user device 110 may piggyback event 1110 with other information provided via a regular server data call. Such an arrangement may conserve bandwidth and may minimize data transferred between user device 110 and mobile server 120.

Once mobile server 120 receives a server data call with a piggyback tag (e.g., "userDataCollection") and event 1110, mobile server 120 may process event 1110 to extract event information 1120. Event information 1120 may include the piggyback tag (e.g., "userDataCollection"), an application ID (e.g., "appId MSV"), a user ID (e.g., "userID 123-456-7890"), a content ID (e.g., "contented 7894578"), an action ID (e.g., "actionID>a020"), a time attribute (e.g., "t_time>2010-08-02-15:33:30"), a location attribute (e.g., "xy_loc>42.39,−71.27"), and a device type attribute (e.g., "h_type>smartphone"). Mobile server 120 may provide event information 1120 to data collection server 130. In one example, mobile server 120 may receive event information 1120 from user device 110 (or may extract event information 1120 from event 1110), and may provide event information 1120 to data collection server 130 with a regular server data call. In other words, mobile server 120 may piggyback event information 1120 with other information provided via a regular server data call. Such an arrangement may conserve bandwidth and may minimize data transferred between mobile server 120 and data collection server 130.

Data collection server 130 may receive event information 1120 from mobile server 120, and may store (e.g., in real time) event information 1120 in a database provided in data collection server 130 (or separate from data collection server 130). In one example, data collection server 130 may create a database record 1130 in the database in real time based on event information 1120. For the above example, database record 1130 may include an application ID field (e.g., "AppID"="MSV"), a user ID field (e.g., "userID"="123-456-7890"), a content ID field (e.g., "contentID"="7894578"), an action ID field (e.g., "actionID"="a020"), a time attribute field (e.g., "t_time"="2010-08-02-15:33:30"), a location attribute field (e.g., "xy_loc"="42.39,−71.27"), and a device type attribute field (e.g., "h_type"="smartphone").

Figure 12:
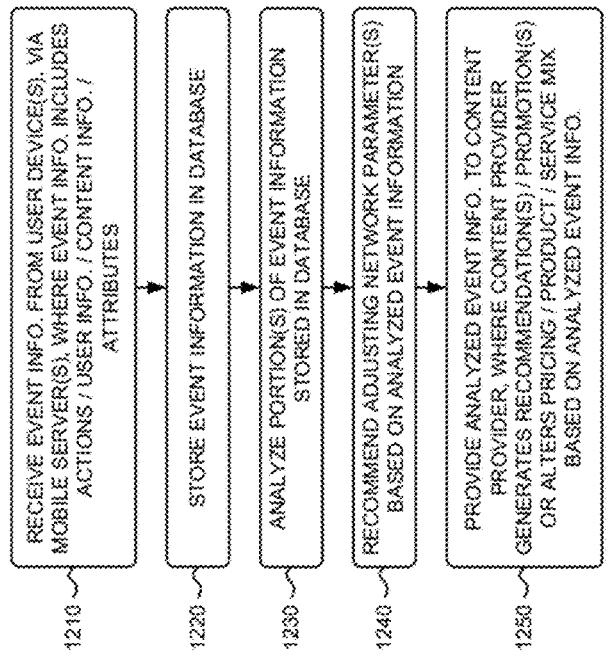
FIG. 12 is a flow chart of an example process for collecting mobile user data according to implementations described herein.

FIG. 12 is a flow chart of an example process 1200 for collecting mobile user data according to implementations described herein. In one implementation, process 1200 may be performed by data collection server 130. In another implementation, some or all of process 1200 may be performed by another device or group of devices, including or excluding data collection server 130.

As shown in FIG. 12, process 1200 may include receiving event information from one or more user devices, via one or more mobile servers, where the event information includes actions, user information, content information, and attributes (block 1210). For example, in implementations described above in connection with FIG. 5, user devices 110 may generate events 510, and may provide events 510 to respective mobile servers 120. Event 510 may include a function (e.g., associated with content provided by content provider 140) performed by user device 110, such as downloading a movie, obtaining a license for content, streaming a movie trailer, watching a live television shown, watching OTT video content, downloading a song, listening to a song, purchasing content, etc. Mobile servers 120 may receive events 510 and may extract event information 520 from events 510. Alternatively, user devices 110 may generate event information 520, and mobile servers 120 may directly receive event information 520 from user devices 110. Event information 520 may include actions (e.g., play, download, search, stop, pause, etc.) performed with user devices 110; information associated with users of user devices 110 (e.g., user IDs, home addresses of the users, email addresses of the users, etc.); information associated with content retrieved, viewed, purchased, streamed, etc. by user devices 110 (e.g., content IDs, content types, content titles, content descriptions, etc.); and attributes associated with user devices 110 (e.g., times content were retrieved by user devices 110, locations of user devices 110, types of user devices 110, etc.).

As further shown in FIG. 12, process 1200 may include storing the event information in a database (block 1220), and analyzing one or more portions of the event information stored in the database (block 1230). For example, in implementations described above in connection with FIG. 5, data collection server 130 may store event information 520 in a database provided in data collection server 130 (or separate from data collection server 130). In one example, data collection server 130 may add information to the database in real time, and may permit the information in the database to be accessed (e.g., by content provider 140) in real time. Data collection server 130 may analyze one or more portions of event information 520 stored in the database, and may produce analyzed data 530 (e.g., analyzed event information 520) based on the analysis. Analyzed data 530 may provide a variety of information, such as, for example, how many user devices 110 utilize content provided by content provider 140; how many times content (e.g., a video) was previewed during the last hour by how many user devices 110 and how many users purchased or rented the content; which content was played in which geographic areas and for how long was it played; how many users used a user device 110 application during the last hour and what are the top ten activities performed by users; how many times a particular function (e.g., function x) of user device 110 was used (e.g., as compared to other user device 110 functions); how many searches were performed by user devices 110; etc.

Returning to FIG. 12, process 1200 may include recommending adjustments to one or more network parameters based on the analyzed event information (block 1240). For example, in implementations described above in connection with FIG. 5, data collection server 130 may recommend adjusting parameters of a network (e.g., network 150) based on analyzed data 530, as indicated by reference number 540. In one example, based on analyzed data 530, data collection server 130 may recommend increasing a bandwidth of network 150; adding network resources (e.g., wireless towers) to network 150; shifting content to a nearest edge storage device (e.g., to decrease retrieval time by user devices 110); streaming and/or downloading content using different bit rates from content provider 140 (e.g., adaptive content delivery) while adjusting and/or increasing network bandwidth as necessary.

As further shown in FIG. 12, process 1200 may include providing the analyzed event information to a content provider, where the content provider generates one or more recommendations and/or promotions or alters a pricing/product/service mix based on the analyzed event information (block 1250). For example, in implementations described above in connection with FIG. 5, content provider 140 may receive analyzed data 530 from data collection server 130, and may generate, based on analyzed data 530, one or more recommendations 550 or one or more promotions 560 for the users of user devices 110, and/or may alter or define prices or a sales policy for products and/or services (e.g., content), as indicated by reference number 570. Content provider 140 may provide recommendations 550, promotions 560, and prices 570 for products or services to one or more user devices 110. Recommendations 550 may include, for example, personalized recommendations, social recommendations, and/or item recommendations. Promotions 560 may include, for example, advertisements for content, special offers for certain users, etc. Prices 570 may include increasing and/or decreasing prices of content provided to user devices 110, altering the types of content offered to user devices 110, etc.

Figure 13:
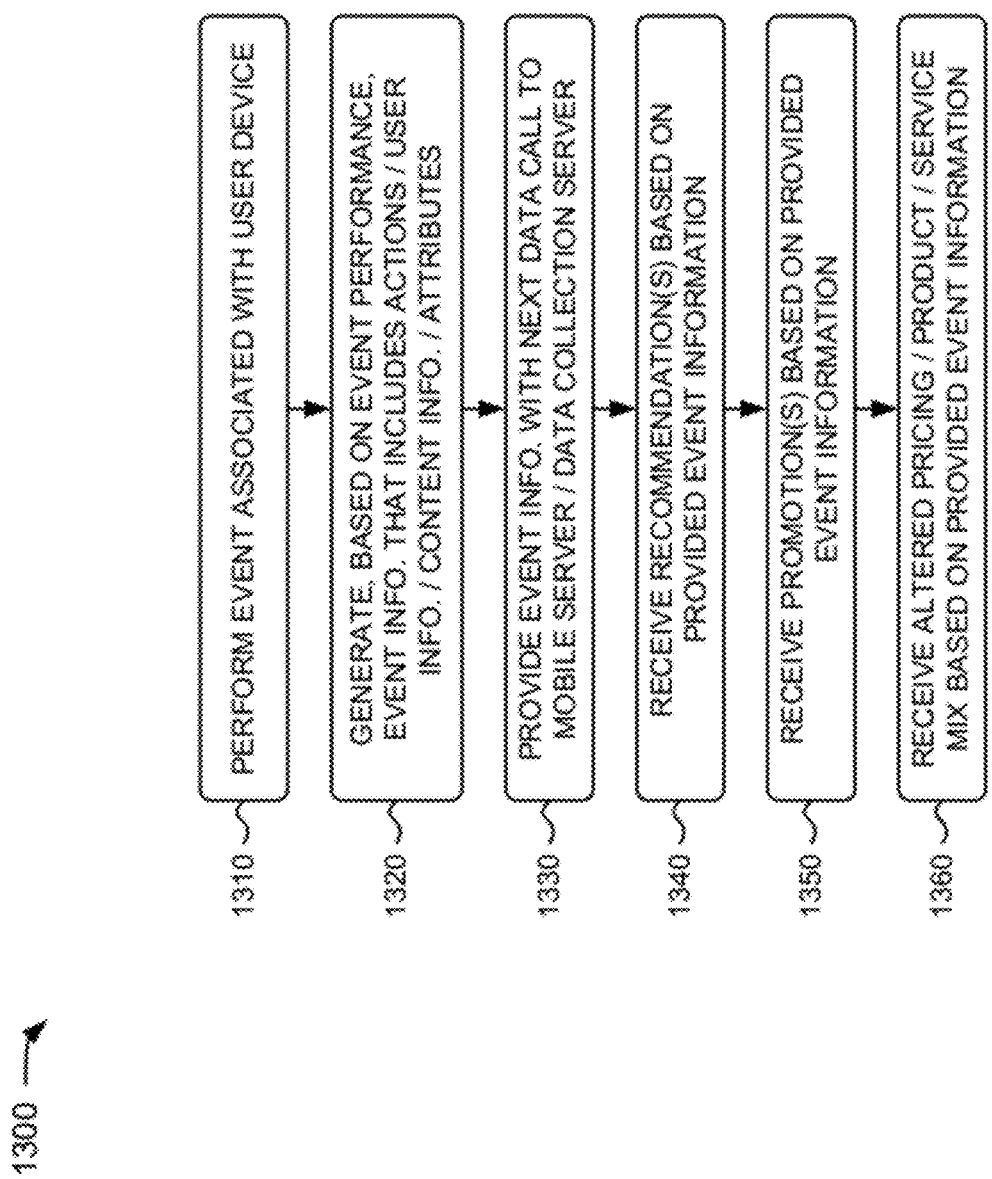
FIG. 13 is a flow chart of an example process for generating mobile user data according to implementations described herein.

FIG. 13 is a flow chart of an example process 1300 for generating mobile user data according to implementations described herein. In one implementation, process 1300 may be performed by user device 110. In another implementation, some or all of process 1300 may be performed by another device or group of devices, including or excluding user device 110.

As illustrated in FIG. 13, process 1300 may include performing an event associated with a user device (block 1310), and generating, based on the event performance, event information that includes actions, user information, content information, and attributes (block 1320). For example, in implementations described above in connection with FIG. 5, user devices 110 may generate events 510, and may provide events 510 to respective mobile servers 120. Event 510 may include a function (e.g., associated with content provided by content provider 140) performed by user device 110, such as downloading a movie, obtaining a license for content, streaming a movie trailer, watching a live television shown, watching OTT video content, downloading a song, listening to a song, purchasing content, etc. Alternatively, user devices 110 may generate event information 520. Event information 520 may include actions (e.g., play, download, search, stop, pause, etc.) performed with user devices 110; information associated with users of user devices 110 (e.g., user IDs, home addresses of the users, email addresses of the users, etc.); information associated with content retrieved, viewed, purchased, streamed, etc. by user devices 110 (e.g., content IDs, content types, content titles, content descriptions, etc.); and attributes associated with user devices 110 (e.g., times content were retrieved by user devices 110, locations of user devices 110, types of user devices 110, etc.).

As further shown in FIG. 13, process 1300 may include providing the event information with a next server data call to a mobile server or a data collection server (block 1330). For example, in implementations described above in connection with FIGS. 1 and 11, user device 110 may provide the event information (e.g., with a next server data call) to mobile server 120 (or directly to data collection server 130), and mobile server 120 may provide the event information to data collection server 130. In one example, user device 110 may provide event 1110 (or event information 1120) to mobile server 120 with a regular server data call. In other words, user device 110 may piggyback event 1110 with other information provided via a regular server data call. Such an arrangement may conserve bandwidth and may minimize data transferred between user device 110 and mobile server 120.

Returning to FIG. 13, process 1300 may include receiving one or more recommendations based on the provided event information (block 1340), receiving one or more promotions based on the provided event information (block 1350), and/or receiving an altered pricing/product/service mix based on the provided event information (block 1360). For example, in implementations described above in connection with FIG. 5, content provider 140 may generate, based on analyzed data 530 (analyzed event information 520), one or more recommendations 550 or one or more promotions 560 for the users of user devices 110, and/or may alter or define prices or a sales policy for products and/or services (e.g., content), as indicated by reference number 570. Content provider 140 may provide recommendations 550, promotions 560, and prices 570 for products or services to one or more user devices 110. Recommendations 550 may include, for example, personalized recommendations, social recommendations, and/or item recommendations. Promotions 560 may include, for example, advertisements for content, special offers for certain users, etc. Prices 570 may include increasing and/or decreasing prices of content provided to user devices 110, altering the types of content offered to user devices 110, etc.

Systems and/or methods described herein may provide for collection of data associated with users of user devices (e.g., mobile phones, smartphones, STBs, etc.). The collected user data may include user usage patterns, feedback, interactions with a content provider, ratings, etc. The collected user data may be used to improve network delivery of content (e.g., video content), such as, for example, increasing bandwidth or expanding a network to reach the users demanding the content. Content providers may utilize the collected user data to make content recommendations to the users, to provide promotions to the users, to define or alter pricing charged for a product or service (e.g., content), etc. The improved network delivery of content and/or the content providers' use of the collected user data, in turn, may provide an improved user experience for the users of the user devices.

The systems and/or methods may provide a simple data collection model that minimizes network usage. For example, the systems and/or methods may use existing server data calls when sending the collected event information from user devices 110 to mobile servers 120 and from mobile servers 120 to data collection server 130. User devices 110 and/or mobile servers 120 may store the collected event information until a next server data call, and may piggyback the stored event information with the next server data call (e.g., when it occurs). In one example, if there is stored event information in a mobile server 120, mobile server 120 may generate a single data call to data collection server 130 in order to report the stored event information. The systems and/or methods may provide a platform with standard APIs that permit multiple user devices 110 to share event information with data collection server 130. The systems and/or methods may also provide a platform with a real time database that permits real time reporting of the analyzed event information (e.g., statistical data). The systems and/or methods may further provide a platform that interfaces with other systems or devices to permit data analysis between user devices 110 and other devices, such as televisions and Internet access devices.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 12 and 13, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" or "logic" that performs one or more functions. These components or logic may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a computing device and from a plurality of user devices, event information associated with the performance of events, by the plurality of user devices, related to usage of content stored in a content delivery network, wherein the event information includes:
      one or more actions performed with the plurality of user devices,
      user information associated with users of the plurality of user devices,
      content information associated with usage of content stored in the content delivery network by the users of the plurality of user devices, and
      one or more attributes associated with the plurality of user devices;
   storing, by the computing device, the event information in a database;
   analyzing, by the computing device, one or more portions of the event information stored in the database;
   recommending, by the computing device and based on the analyzed event information, one or more adjustments to one or more parameters associated with the content delivery network that delivers content to the plurality of user devices, wherein the one or more adjustments to the one or more parameters associated with the content delivery network comprises streaming or downloading content from a content provider of the content delivery network using different bit rates, and at least one of:
      adjusting a bandwidth of the content delivery network,
      adding network resources to the content delivery network, or
      shifting content to an edge storage device of the content delivery network that is nearest at least one of the plurality of user devices,
      and
   providing the analyzed event information to a content provider device,
   wherein the content provider device, based on the analyzed event information, at least one of:
      generates one or more content recommendations for the plurality of user devices,
      generates one or more content promotions for the plurality of user devices, or
      alters pricing for content provided to the plurality of user devices.

2. The method of claim 1, wherein receiving the event information includes:
   receiving the event information via a server data call provided by at least one mobile server.

3. The method of claim 2, wherein the plurality of user devices provide events to the at least one mobile server, and the at least one mobile server extracts the event information from the events.

4. The method of claim 1, wherein each of the one or more actions includes at least one of:
   playing content with the one of the plurality of user devices,
   downloading content with the one of the plurality of user devices,
   searching for content with the one of the plurality of user devices,
   stopping content with the one of the plurality of user devices, pausing content with the one of the plurality of user devices,
streaming content with the one of the plurality of user devices,
purchasing content with the one of the plurality of user devices, or
deleting content with the one of the plurality of user devices.

5. The method of claim 1, wherein the user information includes at least one of:
user identifiers associated with users of the plurality of user devices,
user types associated with users of the plurality of user devices,
home addresses of users of the plurality of user devices,
email address of users of the plurality of user devices,
names of users of the plurality of user devices, or
demographics of users of the plurality of user devices.

6. The method of claim 1, wherein the content information includes at least one of:
identifiers of content associated with the plurality of user devices,
types of content associated with the plurality of user devices,
titles of the content associated with the plurality of user devices, or
descriptions of the content associated with the plurality of user devices.

7. The method of claim 1, wherein each of the one or more attributes includes at least one of:
a time when content is retrieved by one of the plurality of user devices,
a time elapsed between actions performed by one of the plurality of user devices on the content,
a location of the one of the plurality of user devices, or
a model of the one of the plurality of user devices.

8. A device, comprising:
a memory to store a plurality of instructions;
a communication interface coupled to a content delivery network; and
a processor to execute instructions in the memory to:
receive, from a plurality of user devices via the communication interface, event information associated with the performance of events, by the plurality of user devices, related to usage of content stored in a content delivery network, wherein the event information includes:
one or more actions performed with the plurality of user devices,
user information associated with users of the plurality of user devices,
content information associated with usage of the content stored in the content delivery network by the users of the plurality of user devices, and
one or more attributes associated with the plurality of user devices, store the event information,
analyze one or more portions of the stored event information,
recommend, based on the analyzed event information, one or more adjustments to one or more parameters associated with the content delivery network that delivers content to the plurality of user devices, wherein the one or more adjustments to the one or more parameters associated with the content delivery network comprises shifting content to an edge storage device of the content delivery network that is nearest at least one of the plurality of user devices, and at least one of:
increasing a bandwidth of the content delivery network,
adding network resources to the content delivery network,
or
streaming or downloading content from a content provider of the content delivery network using different bit rates and adjusting a bandwidth of the content delivery network, and
provide the analyzed event information to a content provider device,
wherein the content provider device, based on the analyzed event information, at least one of:
generates one or more content recommendations for the plurality of user devices,
generates one or more content promotions for the plurality of user devices, or
alters pricing for content provided to the plurality of user devices.

9. The device of claim 8, wherein each of the one or more actions includes at least one of:
playing content with one of the plurality of user devices,
downloading content with the one of the plurality of user devices,
searching for content with the one of the plurality of user devices,
stopping content with the one of the plurality of user devices,
pausing content with the one of the plurality of user devices,
streaming content with the one of the plurality of user devices,
purchasing content with the one of the plurality of user devices, or
deleting content with the one of the plurality of user devices.

10. The device of claim 8, wherein the user information includes at least one of:
user identifiers associated with users of the plurality of user devices,
user types associated with users of the plurality of user devices,
home addresses of users of the plurality of user devices,
email addresses of users of the plurality of user devices,
names of users of the plurality of user devices, or
demographics of users of the plurality of user devices.

11. The device of claim 8, wherein the content information includes at least one of:
identifiers of content associated with the plurality of user devices,
types of content associated with the plurality of user devices,
titles of the content associated with the plurality of user devices, or
descriptions of the content associated with the plurality of user devices.

12. The device of claim 8, wherein each of the one or more attributes includes at least one of:
a time when content is retrieved by one of the plurality of user devices,
a time elapsed between actions performed by the one of the plurality of user devices on the content,
a location of the one of the plurality of users devices, or
a model of the one of the plurality of user devices.

13. The method of claim 1, wherein recommending the one or more adjustments to the one or more parameters associated with the content delivery network comprises recommending at least two of:
increasing a bandwidth of the content delivery network,
adding network resources to the content delivery network, or
shifting content to an edge storage device of the content delivery network that is nearest at least one of the plurality of user devices.

14. The method of claim 1, further comprising:
recommending, based on the analyzed event information, altering prices associated with content provided to the users of the plurality of user devices.

15. The device of claim 8, wherein the one or more adjustments to
the one or more parameters associated with the content delivery network comprises at least two of:
increasing a bandwidth of the content delivery network,
adding network resources to the content delivery network, or
streaming or downloading content from a content provider of the content delivery network using different bit rates and adjusting a bandwidth of the content delivery network.

16. The device of claim 8, wherein the processor is further configured to execute instructions in the memory to:
recommend, based on the analyzed event information, altering prices associated with content provided to the users of the plurality of user devices.

* * * * *